(12) United States Patent
Huotari

(10) Patent No.: US 11,975,495 B2
(45) Date of Patent: May 7, 2024

(54) HYBRID WELDING OF THERMOPLASTICS

(71) Applicant: Magna Exteriors Inc., Concord (CA)

(72) Inventor: Keijo Huotari, Fenton, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 17/525,480

(22) Filed: Nov. 12, 2021

(65) Prior Publication Data
US 2022/0063209 A1 Mar. 3, 2022

Related U.S. Application Data

(63) Continuation of application No. 15/575,650, filed as application No. PCT/US2016/033302 on May 19, 2016, now Pat. No. 11,198,255.
(Continued)

(51) Int. Cl.
| | |
|---|---|
| *B29C 65/72* | (2006.01) |
| *B29C 65/00* | (2006.01) |
| *B29C 65/02* | (2006.01) |
| *B29C 65/48* | (2006.01) |
| *B60J 5/10* | (2006.01) |
| *B62D 65/00* | (2006.01) |

(Continued)

(52) U.S. Cl.
CPC .............. *B29C 65/72* (2013.01); *B29C 65/02* (2013.01); *B29C 65/483* (2013.01); *B29C 65/484* (2013.01); *B29C 66/026* (2013.01); *B29C 66/028* (2013.01); *B29C 66/301* (2013.01); *B29C 66/3452* (2013.01); *B29C 66/54* (2013.01); *B29C 66/73921* (2013.01); *B60J 5/10* (2013.01); *B60J 5/101* (2013.01); *B62D 65/00* (2013.01); *B29C 65/06* (2013.01); *B29C 65/08* (2013.01); *B29C 65/1412* (2013.01); *B29C 65/16* (2013.01); *B29C 65/34* (2013.01); *B29C 66/02* (2013.01); *B29L 2031/30* (2013.01)

(58) Field of Classification Search
CPC ..... B29C 65/72; B29C 65/484; B29C 66/026; B29C 66/028; B29C 66/301; B29C 66/54; B29C 66/73921; B60J 5/10; B62D 65/00
See application file for complete search history.

(56) References Cited

U.S. PATENT DOCUMENTS

| | | | |
|---|---|---|---|
| 2008/0152919 A1* | 6/2008 | Grgac | ................. B29C 65/3468 428/411.1 |
| 2008/0196816 A1* | 8/2008 | Lewno | ....................... B60J 1/16 156/99 |

(Continued)

*Primary Examiner* — Vishal I Patel
(74) *Attorney, Agent, or Firm* — Warn Partners, P.C.

(57) ABSTRACT

A process for welding of at least two separate vehicle panels (12, 14) to form an integral part (16) for a vehicle. There is provided at least one first panel (12) including a first weld line area (18) and at least one second panel (14) including a corresponding second weld line area (19), the second weld line area (19) abutting in a weldable relationship to the first weld line area (18). The first and second weld line areas (18, 19) have at least one first weldable portion (22) and at least one second portion (24) at which welding is substantially hindered during welding attachment of the first and second panels (12, 14). The process includes applying a curable adhesive at each second portion (24), placing in a welding fixture and welding the panels (12, 14) at each first weldable portion (22) such that the panels (12, 14) are held together during curing of the adhesive.

16 Claims, 5 Drawing Sheets

Related U.S. Application Data

(60) Provisional application No. 62/164,251, filed on May 20, 2015.

(51) Int. Cl.
　　　*B29C 65/06*　　　(2006.01)
　　　*B29C 65/08*　　　(2006.01)
　　　*B29C 65/14*　　　(2006.01)
　　　*B29C 65/16*　　　(2006.01)
　　　*B29C 65/34*　　　(2006.01)
　　　*B29L 31/30*　　　(2006.01)

(56) References Cited

U.S. PATENT DOCUMENTS

2013/0122246 A1* 5/2013 Berger .................... B32B 15/08
　　　　　　　　　　　　　　　　　　　　　　156/92
2014/0356053 A1* 12/2014 Urayama ............ B29C 65/3616
　　　　　　　　　　　　　　　　　　　　　　156/92

* cited by examiner

HYBRID WELDING OF THERMOPLASTICS

CROSS-REFERENCE TO RELATED APPLICATIONS

This application is a continuation of U.S. patent application Ser. No. 15/575,650, filed Nov. 20, 2017, which is a National Stacie of PCT International Application No. PCT/US2016/033302, filed May 19, 2016, which claims the benefit of U.S. Provisional Patent Application No. 62/164,251, filed May 20, 2015. The disclosures of the above applications are incorporated herein by reference.

FIELD OF THE INVENTION

The present invention relates to a process for welding of polymer body panels

BACKGROUND OF THE INVENTION

The use of composite parts made of polymer materials in substitution for steel and other body parts in vehicles has been increasingly more desirable in recent years. This is primarily because of weight savings such parts have over similar steel parts which the polymer parts replace.

Typically, such parts are made with inner and outer panels forming the necessary contours and attachment points for fitting the particular vehicle application. As with the metal counterparts, it is necessary to attach the inner and outer panels together in order to make a one piece assembly such as a rear lift gate for example.

There are many ways of attaching these panels together such as with fasteners, adhesives and the like. However, each of these methods have drawbacks and when it is desired to have the two pieces joined in an integral assembly, welding of the two parts together along joining seams or areas is the most desirable method.

Typically, welding has been successfully applied, however, certain areas of connection in these parts have been found to be problematic. For instance, in vertical meeting areas along the weld lines the angle of attack is too severe and the welding cannot be done properly. This causes potential quality control problems at these welds and increases the amount of scrap parts in production. Typically, if part geometry is not relatively planar, abrupt surface changes cause an interruption of the weld.

Therefore, there remains a need in the art to provide a process which can be used to effectively join parts in areas which are hard to access in traditional welding operations.

SUMMARY OF THE INVENTION

A process for welding of two separate vehicle panels to form an integral part for a vehicle is provided. In the process a first panel is provided which includes a first weld line area which provides the desired points or areas of attachment between the first panel and the second panel. A second panel is provided including a corresponding second weld line area which corresponds to the areas of attachment of the first panel and abutting in a weldable relationship to the first weld line area. The first and second weld line areas include a first weldable portion and a second portion at which welding is substantially hindered during welding attachment of the first and second panels. A curable adhesive is provided and applied at the second portion. The panels are then placed in position for welding. The panels are then welded at the first weldable portion such that the panels are held together during curing of said adhesive.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
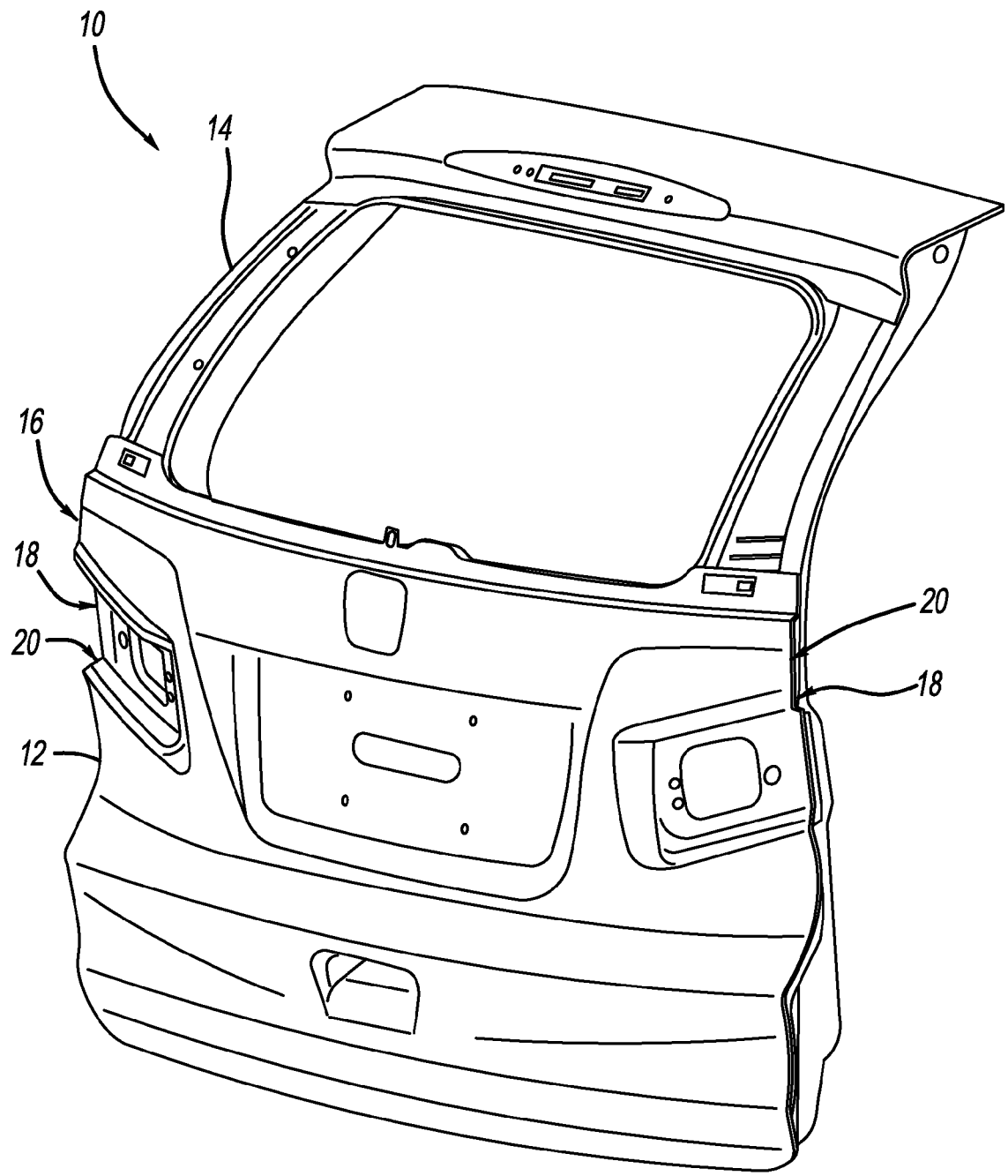
FIG. 1 is a perspective view of a rear liftgate manufactured in accordance with the teachings of the present invention.
Figure 2:
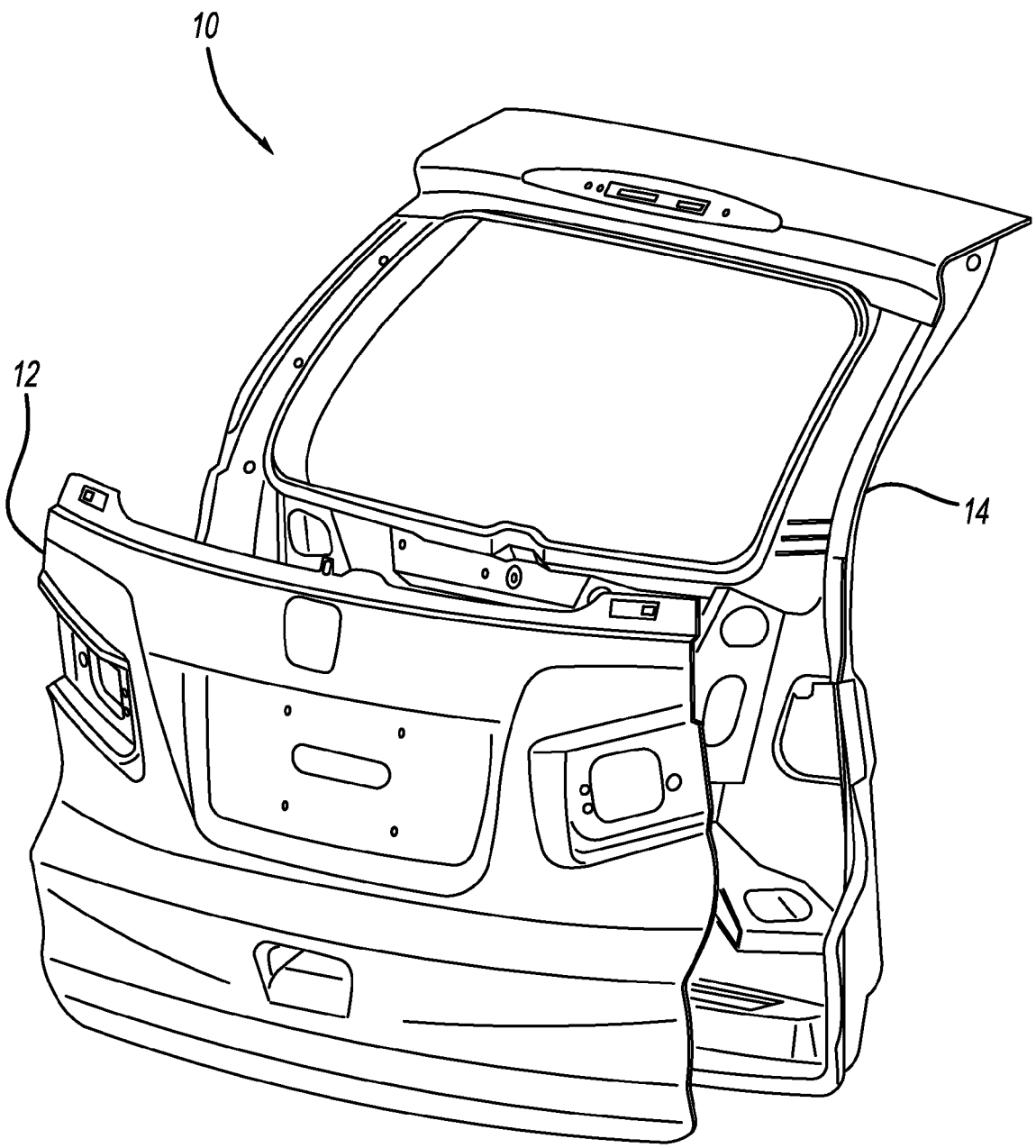
FIG. 2 is an exploded perspective view of the liftgate of FIG. 1.
Figure 3:
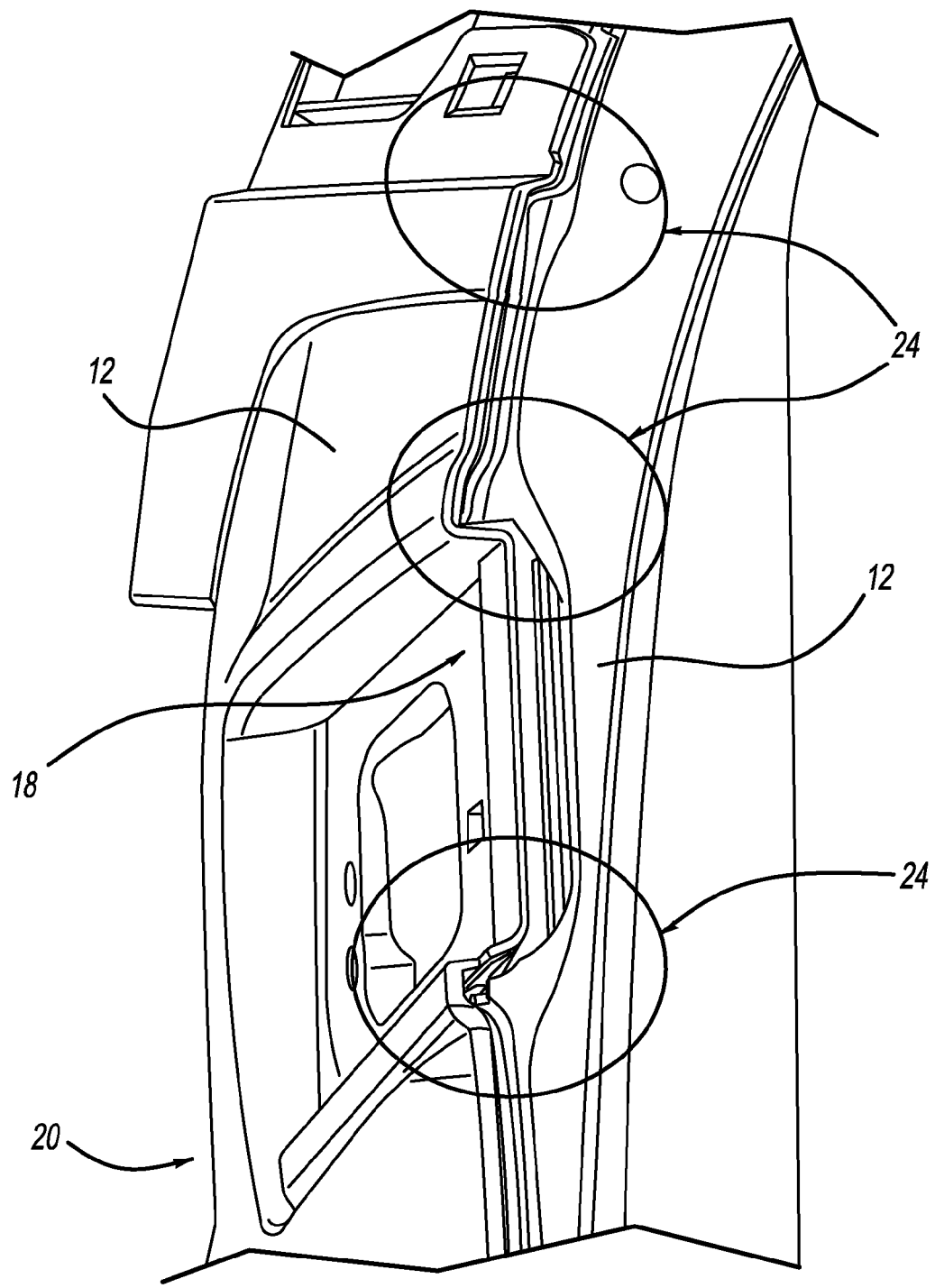
FIG. 3 is a sectional view of the liftgate of FIGS. 1 and 2 showing weld line areas in a typical welding process.
Figure 4:
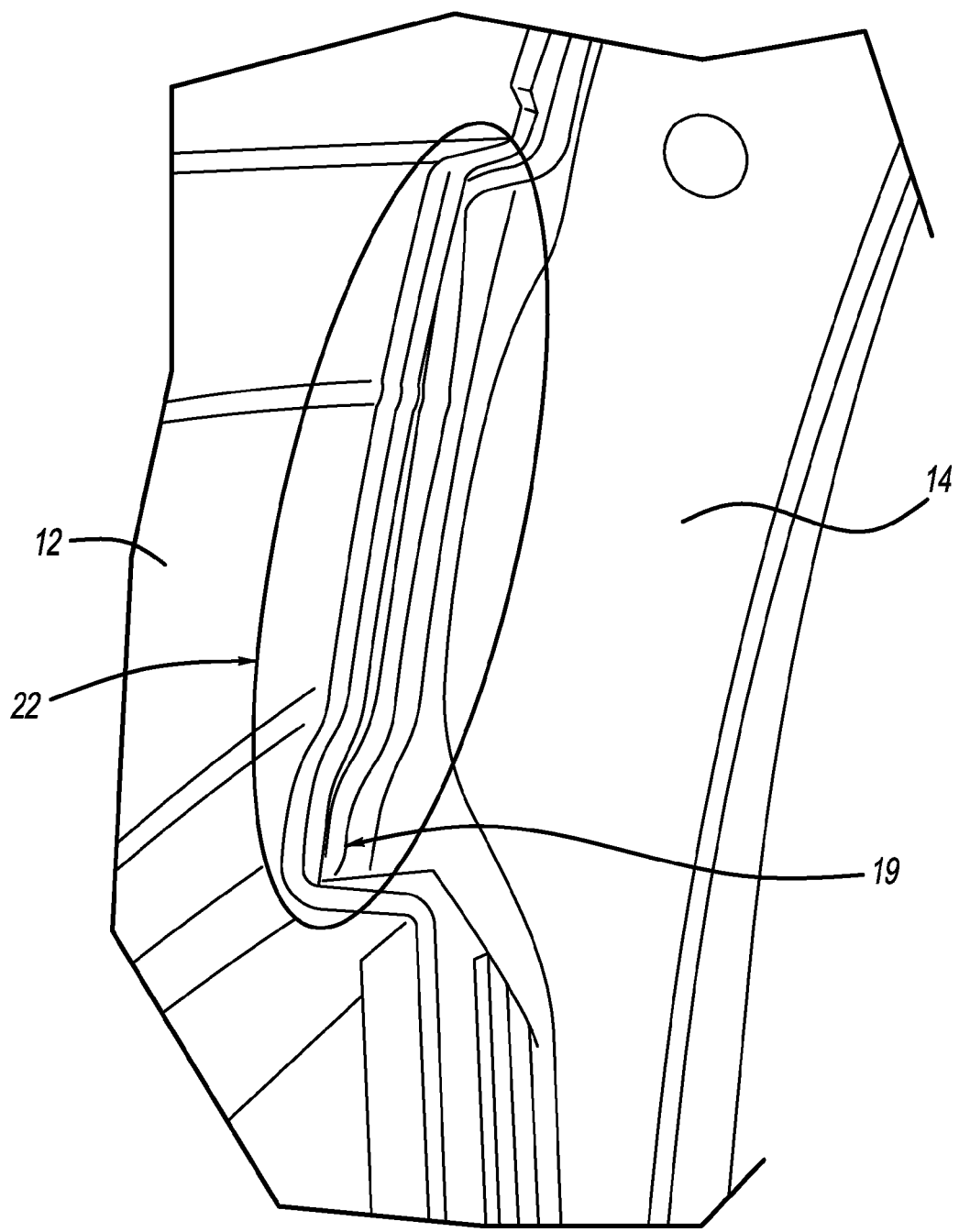
FIG. 4 is a detailed sectional view showing a weldable area of the part illustrated in FIGS. 1 and 2; and, FIG. 5 is a detailed sectional view showing a typical area which is not readily weldable where adhesive would be applied in accordance with the process of the present invention.
Figure 5:
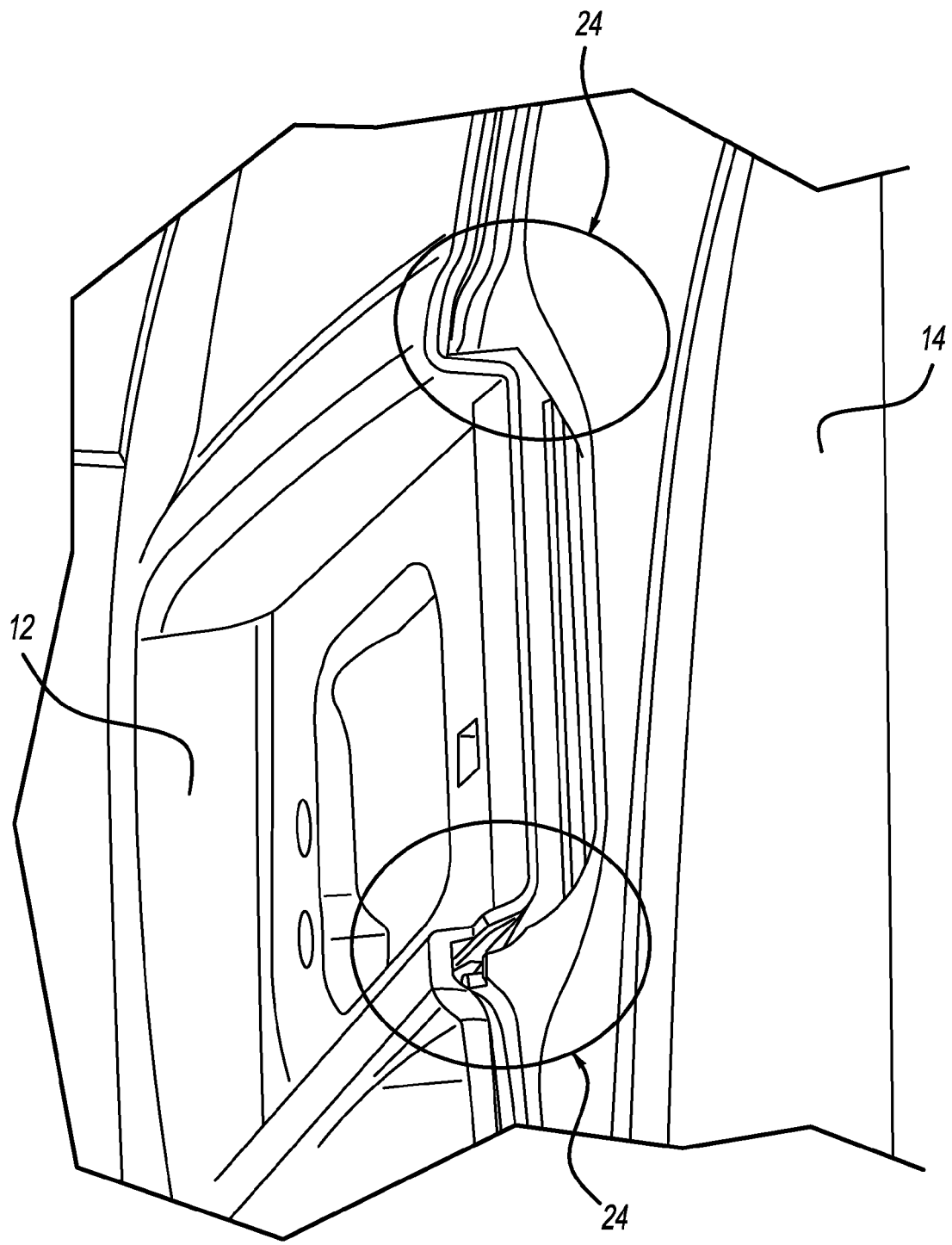

The following description of the preferred embodiment(s) is merely exemplary in nature and is in no way intended to limit the invention, its application, or uses.

In accordance with the present invention there is provided a process generally indicated at 10 for welding of at least two separate vehicle panels 12 and 14 to form an integral part generally indicated at 16 for a vehicle, e.g., such as a composite rear liftgate for a sport utility vehicle (SUV).

In the process 10 a first panel 12 (here shown as an outer panel) is provided which includes at least a first weld line area shown generally at 18 which provides the desired points or areas of attachment shown generally at between the first panel 12 and a second panel 14 (here shown as an inner panel). The weld line is typically along the outer edge areas of the panels 12,14. Where the contour of the first and second panels 12,14 change to vertical (when the panels 12,14 are horizontal on a welding fixture) such as at the tail light opening, welding becomes problematic. The second panel 14 is provided including at least a corresponding second weld line area shown generally at 19 which corresponds to the areas of attachment 20 of the first panel 12 and abutting in a weldable relationship to the first weld line area 18. The first and second weld line areas 18,19 include a first weldable portion 22, and a second portion 24 at which welding is substantially hindered during welding attachment of the first 12 and second 14 panels.

A curable adhesive is provided and applied at the second portion 24. The adhesive can be any adhesive that is heat resistant and provides a solid bond at the portion of the panels. In a preferred process welding is accomplished by infrared welding techniques where heat is generated. In a preferred process adhesives which are not curable, cured or otherwise heat sensitive is used to avoid premature curing of the adhesive before or during welding. By way of illustration but not limitation a moisture curable urethane adhesive such as a BETASEAL 1 windshield adhesive available from Dow™ Chemical of Midland Michigan is suitable for use in the areas which are not easily welded. Prior to this step the first and second panels 12,14 of course are molded and painted for the final assembly and pre-assembled, as required. As an option, areas which adhesive is to be applied are preferably flame treated and primed to provide superior bonding of the adhesive.

The first and second panels 12,14 are then placed in position for welding in a welding fixture or the like. The first and second panels 12,14 are then welded at the first weldable portion 22 such that the panels 12,14 are held together during curing of said adhesive. Welding can be accomplished by laser, ultrasonic, vibration, infrared, resistive implant welding or other conventional plastics welding techniques. A particularly preferred welding technique is infrared welding of the parts in the subject invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for welding of two separate vehicle panels to form an integral part for a vehicle, comprising:
   providing a first panel including a first weld line area;
   providing a second panel including a corresponding second weld line area, said second weld line area for abutting in a weldable relationship to the first weld line area wherein said first and second weld line areas have a first weldable portion and second portion at which welding is substantially hindered by abrupt angle changes during welding attachment of the first and second panels;
   applying a curable adhesive at said second portion and placing said first and second panels in welding position; and,
   welding said panels at said first weldable portion such that said panels are held together during curing of said adhesive.

2. The process of claim 1, wherein there are a plurality of first weldable portions and second portions.

3. The process of claim 1, wherein said adhesive is a urethane adhesive.

4. The process of claim 3, wherein the adhesive is water cured.

5. The process of claim 1, wherein the adhesive is not curable, cured by or otherwise heat sensitive.

6. The process of claim 1, wherein the second portion is at an area of changed geometry.

7. The process of claim 1, further comprising flame treating the second portion prior to applying the adhesive for enhancing adhesiveness of the panel material.

8. The process of claim 1, further comprising applying primer to the second portion prior to applying the adhesive for enhancing adhesiveness of the panel material.

9. The process of claim 1, further comprising painting at least the first panel prior to applying the adhesive.

10. The process of claim 1, further comprising loading the first and second panels into a welding fixture prior to welding said panels.

11. The process of claim 1, wherein the panels form a rear liftgate.

12. The process of claim 1, wherein the welding process is a resistive implant welding process.

13. The process of claim 1, wherein the welding process is a laser welding process.

14. The process of claim 1, wherein the welding process is an infrared welding process.

15. The process of claim 1, wherein the welding process is an ultrasonic welding process.

16. The process of claim 1, wherein the welding process is a vibratory welding process.

* * * * *